United States Patent
Kawafuji

(10) Patent No.: US 8,107,095 B2
(45) Date of Patent: Jan. 31, 2012

(54) CONTROLLING PROGRAM, CONTROLLING APPARATUS, IMAGE FORMING APPARATUS AND PRINT CONTROLLING METHOD

(75) Inventor: Mitsuhiro Kawafuji, Kawasaki (JP)

(73) Assignee: Konica Minolta Business Technologies, Inc. (JP)

( * ) Notice: Subject to any disclaimer, the term of this patent is extended or adjusted under 35 U.S.C. 154(b) by 1051 days.

(21) Appl. No.: 12/009,095

(22) Filed: Jan. 16, 2008

(65) Prior Publication Data

US 2008/0212122 A1 Sep. 4, 2008

(30) Foreign Application Priority Data

Mar. 1, 2007 (JP) ................... 2007-051046

(51) Int. Cl.
- G06F 15/00 (2006.01)
- G06F 3/12 (2006.01)
- G06K 1/00 (2006.01)
- G06K 15/00 (2006.01)

(52) U.S. Cl. ...................... 358/1.13; 358/1.18

(58) Field of Classification Search .................. None
See application file for complete search history.

(56) References Cited

U.S. PATENT DOCUMENTS

| | | | |
|---|---|---|---|
| 2003/0159114 A1* | 8/2003 | Nishikawa et al. | 715/530 |
| 2011/0149318 A1* | 6/2011 | Fukada et al. | 358/1.9 |

FOREIGN PATENT DOCUMENTS

| | | |
|---|---|---|
| JP | 8-202863 A | 8/1996 |
| JP | 2002-82931 A | 3/2002 |
| JP | 2003-323289 A | 11/2003 |
| JP | 2006-256138 A | 9/2006 |
| JP | 2007-15168 A | 1/2007 |

OTHER PUBLICATIONS

Japanese "Office Action" dated Feb. 23, 2009 for counterpart Japanese Application No. 2007-051046; together with an English-language translation thereof.

* cited by examiner

*Primary Examiner* — Douglas Tran
(74) *Attorney, Agent, or Firm* — Cantor Colburn LLP

(57) ABSTRACT

There is described a controlling program, a controlling apparatus, an image forming apparatus and a print controlling method, each to be employed in the variable-data printing. The controlling apparatus that controls a variable-data printing to create plural sets of print products based on print data provided with a variable field to which variable printing contents are to be applied for the plural sets of the print products, so as to convert the print data to raster image data, includes: a record acquiring section to acquire the plural records to be applied to the variable field; and a specifying section to specify, for each of the plural sets of print products, one kind of paper sheet out of plural kinds of paper sheets, based on correlation information in which the plural records and the plural kinds of paper sheets are correlated with each other.

12 Claims, 7 Drawing Sheets

FIG. 5

| ADDRESS 1 | PRINT DATA 1-1 | PRINT DATA 1-2 | PRINT DATA 1-3 | ... |
|---|---|---|---|---|
| ADDRESS 2 | PRINT DATA 2-1 | PRINT DATA 2-2 | PRINT DATA 2-3 | ... |
| ADDRESS 3 | PRINT DATA 3-1 | PRINT DATA 3-2 | PRINT DATA 3-3 | ... |
| ADDRESS 4 | PRINT DATA 4-1 | PRINT DATA 4-2 | PRINT DATA 4-3 | ... |
| ADDRESS 5 | PRINT DATA 5-1 | PRINT DATA 5-2 | PRINT DATA 5-3 | ... |
| ⋮ | ⋮ | ⋮ | ⋮ | |

FIG. 6

| ADDRESS 1 | normal PROPERTY |
| --- | --- |
| ADDRESS 2 | VIP PROPERTY |
| ADDRESS 3 | normal PROPERTY |
| ADDRESS 4 | high class PROPERTY |
| ADDRESS 5 | normal PROPERTY |
| ⋮ | ⋮ |

FIG. 7

| normal PROPERTY | NORMAL PAPER SHEET (TRAY 1) |
| --- | --- |
| high class PROPERTY | COLOR PAPER SHEET (TRAY 2) |
| VIP PROPERTY | COATED PAPER SHEET (TRAY 3) |
| ⋮ | ⋮ |

FIG. 8

| ADDRESS 1 | normal PROPERTY | NORMAL PAPER SHEET (TRAY 1) |
| --- | --- | --- |
| ADDRESS 2 | VIP PROPERTY | COATED PAPER SHEET (TRAY 3) |
| ADDRESS 3 | normal PROPERTY | NORMAL PAPER SHEET (TRAY 1) |
| ADDRESS 4 | high class PROPERTY | COLOR PAPER SHEET (TRAY 2) |
| ADDRESS 5 | normal PROPERTY | NORMAL PAPER SHEET (TRAY 1) |
| ⋮ | ⋮ | ⋮ |

FIG. 9

| ADDRESS 1 | normal PROPERTY | NORMAL PAPER SHEET (TRAY 1) | GOTHIC | |
|---|---|---|---|---|
| ADDRESS 2 | VIP 1 PROPERTY | COATED PAPER SHEET (TRAY 3) | HELVETICA | |
| ADDRESS 3 | normal PROPERTY | NORMAL PAPER SHEET (TRAY 1) | GOTHIC | |
| ADDRESS 4 | high class PROPERTY | COLOR PAPER SHEET (TRAY 2) | COURIER NEW | |
| ADDRESS 5 | VIP 2 PROPERTY | COATED PAPER SHEET (TRAY 3) | HELVETICA | WITH FRAGRANCE |
| ⋮ | ⋮ | ⋮ | ⋮ | ⋮ |

FIG. 10

| ADDRESS 1 | NORMAL PAPER SHEET (TRAY 1) |
|---|---|
| ADDRESS 2 | COATED PAPER SHEET (TRAY 3) |
| ADDRESS 3 | NORMAL PAPER SHEET (TRAY 1) |
| ADDRESS 4 | COLOR PAPER SHEET (TRAY 2) |
| ADDRESS 5 | NORMAL PAPER SHEET (TRAY 1) |
| ⋮ | ⋮ |

REALIGNING

| ADDRESS 1 | NORMAL PAPER SHEET (TRAY 1) |
|---|---|
| ADDRESS 3 | NORMAL PAPER SHEET (TRAY 1) |
| ADDRESS 5 | NORMAL PAPER SHEET (TRAY 1) |
| ADDRESS 4 | COLOR PAPER SHEET (TRAY 2) |
| ADDRESS 2 | COATED PAPER SHEET (TRAY 3) |
| ⋮ | ⋮ |

CONTROLLING PROGRAM, CONTROLLING APPARATUS, IMAGE FORMING APPARATUS AND PRINT CONTROLLING METHOD

This application is based on Japanese Patent Application No. 2007-051046 filed on Mar. 1, 2007 with Japan Patent Office, the entire content of which is hereby incorporated by reference.

BACKGROUND OF THE INVENTION

The present invention relates to a controlling program, a controlling apparatus, an image forming apparatus and a print controlling method, and specifically relates to a controlling program, a controlling apparatus, an image forming apparatus and a print controlling method, each for controlling the variable-data printing in which elements such as destinations, etc. may be changed from one printed piece to the next.

In recent years, there have been increasingly proliferated in the market various kinds of copiers or multi-functional apparatuses, each provided with a combination of plural functions, such as a copy function, a facsimile function, a printer function, a scanner function, etc., (hereinafter, referred to as an image forming apparatus as a general term for each of them). Further, some of recently developed image forming apparatuses have been provided with such the printing function called the variable-data printing that makes it possible to change printing elements, such as text, graphics and images, from one printed piece to the next without stopping or slowing down the printing process. By employing such the variable-data printing function, it has become possible to easily cerate direct mails addressed to a plurality of customers.

When conducting the variable-data printing, it is also possible to change a kind of paper sheets to be employed in the printing. For instance, Tokkai 2003-323289 (Japanese Non-Examined Patent Publication) sets forth a variable-data printing apparatus, which makes it possible either to designate a specific paper sheet by including paper-sheet feeding information into the print data as the variable field, or to designate non-printing of a specific page by including printing yes-or-no information as well.

Since the upward improvement of the reply ratio and the sales proliferation effect, each of which can be achieved by appeal powers to the users, are required in the various fields of the variable-data printing, represented by the direct mailing field, it has been one of important methods for achieving the abovementioned goals to change a kind of paper sheet for specific users.

However, according to the variable-data printing apparatus set forth in Tokkai 2003-323289 cited in the above, it is necessary to designate a kind of paper sheet for every master document data to be employed for the printing. Concretely speaking, the contents (for instance, characters, images such as photographic pictures, etc.) to be inserted into the variable field in the master document data are to be determined by referring to each of records stored in the reference file, which is separately provided. Accordingly, the reference file should be newly updated for every master document data to be employed for the printing. Therefore, the operator should designate what kind of paper sheet is employed for each of the users concerned, every time when he creates the master document data. Accordingly, there has been a problem that it is impossible to easily cope with such a demand that the high-quality paper sheets should be always employed for a specific destination (a specific user), irrespective of whether or not conducting operations for updating the master document data, or newly creating them.

Further, the abovementioned problem would arise, not only when a kind of paper sheet should be changed, but also when the operator wishes to change the form of the print products for the specific destination without changing the contents of the print products, as well.

SUMMARY OF THE INVENTION

To overcome the abovementioned drawbacks in conventional image forming apparatus, it is one of objects of the present invention to provide a controlling program, a controlling apparatus, an image forming apparatus and a print controlling method, each of which makes it possible to easily designate the format of the print product, corresponding to the printing contents stored in the variable field.

Accordingly, at least one of the objects of the present invention can be attained by the controlling program and a controlling apparatus described as follows.

(1) According to a computer readable medium reflecting an aspect of the present invention, the computer readable medium storing a computer executable program for carrying out a variable-data printing to create plural sets of print products based on print data provided with a variable field to which variable printing contents are to be applied for the plural sets of the print products, the program comprising program code for causing a computer to perform the steps of: acquiring plural records each of which is to be applied to the variable field; and specifying, for each of the plural sets of the print products, one kind of paper sheet out of plural kinds of paper sheets, based on correlation information in which the plural records and the plural kinds of paper sheets are correlated with each other.

(2) According to a computer readable medium reflecting another aspect of the present invention, the computer readable medium storing a computer executable program for carrying out a variable-data printing to create plural sets of print products based on print data provided with a variable field to which variable printing contents are to be applied for the plural sets of the print products, the program comprising program code for causing a computer to perform the steps of: acquiring plural records to be applied to the variable field; and specifying, for each of the plural sets of the print products, one format out of formats of the plural print products, based on correlation information in which the plural records and the formats of the plural print products are correlated with each other; wherein each of the formats of the plurality of print products is established by selecting at least one of a kind of paper sheet, a font or a shape of characters, a color of characters, a color of background, a design of background, a presence or absence of fragrance, and a kind of fragrance.

(3) According to still another aspect of the present invention, in the computer readable medium recited in item 1 or 2, the program further comprising program code for causing the computer to perform the step of: re-ordering the plural records so that the plural records are sorted in accordance with the kinds of the paper sheets or the formats of the print products.

(4) According to still another aspect of the present invention, in the computer readable medium recited in any one of items 1-3, the plural records applied to the variable field are correlated with the plurality of destinations; and the correlation information is updated or created, based on a usage history of each of the plurality of destinations.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 shows an exemplary configuration of a database of print data, embodied in the present invention;

FIG. 6 shows a concrete example of correlation information (between addresses and properties), embodied in the present invention;

FIG. 7 shows another concrete example of correlation information (between properties and kinds of paper sheets), embodied in the present invention;

FIG. 8 shows still another concrete example of correlation information (between addresses, properties and kinds of paper sheets), embodied in the present invention;

FIG. 9 shows yet another concrete example of correlation information (between addresses, properties, kinds of paper sheets, shapes of characters and presence or absence of fragrance), embodied in the present invention; and FIG. 10 shows an explanatory schematic diagram for explaining an operation for changing the printing order, in an embodiment of the present invention.

DETAILED DESCRIPTION OF THE PREFERRED EMBODIMENTS

Figure 1:
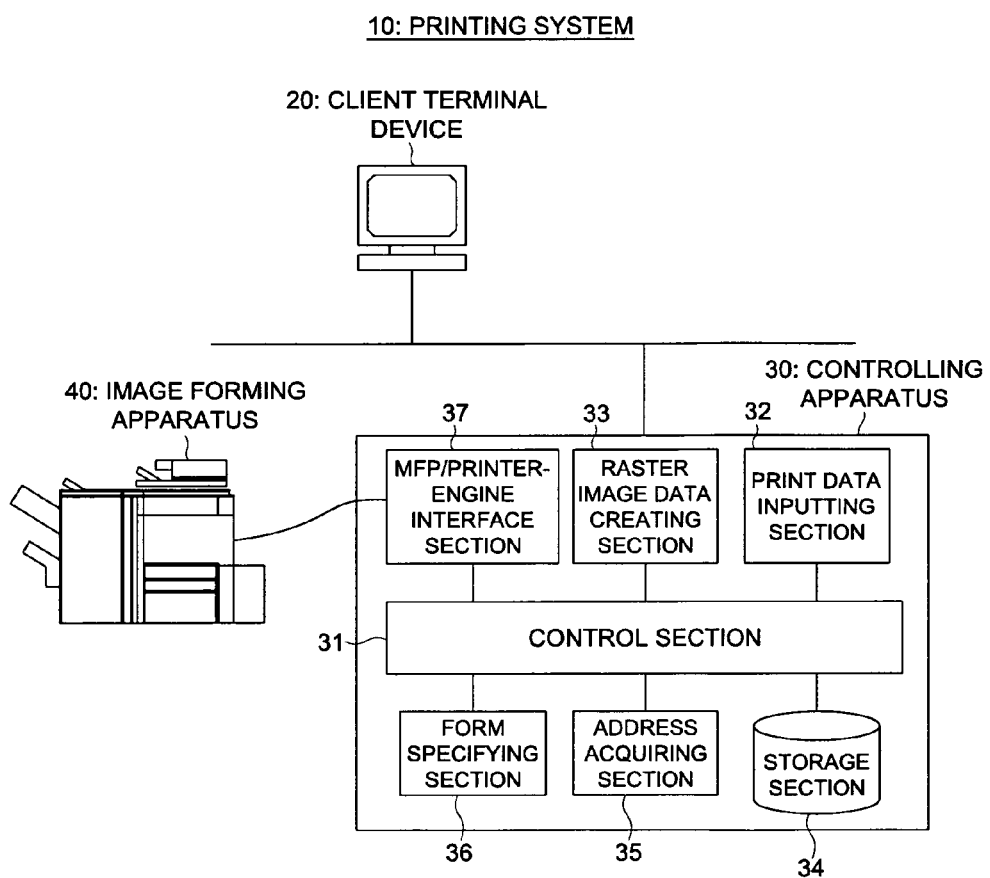
FIG. 1 shows a schematic diagram of a configuration of a printing system embodied in the present invention.

As described in the "BACKGROUND OF THE INVENTION" section, when changing a kind of paper sheet, etc., in the variable-data printing operation, conventionally, the operator has designated the kind of paper sheet and/or has instructed the non-printing of a specific page by storing such the instructions into the field for designating the kind of paper sheet, provided in advance in the master document data. However, according to the conventional method as mentioned in the above, since the operator should designate the kind of paper sheet every time when he creates the master document data, it has been impossible to easily cope with such the demand that the high-quality paper sheets should be always employed for the specific destination.

The abovementioned problem has been caused by the fact that the kind of paper sheet is designated by utilizing the master document data and the reference file to be referred to thereby. Accordingly, to solve the abovementioned problem in the present embodiment, the property of the destination (of customer) is made to be controlled separately from the master document data and the reference file, so that the operator can appropriately establish the format of the print products, such as a kind of paper sheet, etc., corresponding to the property of the destination, at any time.

Concretely speaking, in the printing system including a client terminal device to designate the variable-data printing for conducting a printing operation while changing the destinations, a controlling apparatus to convert print data to raster image data capable of being processed in an image forming apparatus and an image forming apparatus to implement the variable-data printing, based on the raster image data of every destination, which are coupled to each other through the communication network, correlation information for correlating each of the destinations with each of the formats of the print products, such as a kind of paper sheet, etc., are stored in advance into the controlling apparatus or a server being referable by the controlling apparatus, so that the controlling apparatus can acquire a plurality of destinations from the print data based on the master document data, and can specify the format of the print products conformity with each of the plurality of destinations acquired, so as to print the image based on the raster image data in the format corresponding to each of the plurality of destinations acquired.

According to the abovementioned configuration embodied in the present invention, when printing the print products, such as the direct mails or the like, it becomes possible to automatically establish the format of the print products, such as a kind of paper sheet, etc., corresponding to each of the addresses. Accordingly, for instance, it becomes possible to increase a degree of appealing effect to the important customer by using the high-quality paper sheets in conformity with an importance degree of the address (customer) concerned, instead of using normal paper sheets.

Embodiment

Figure 2:
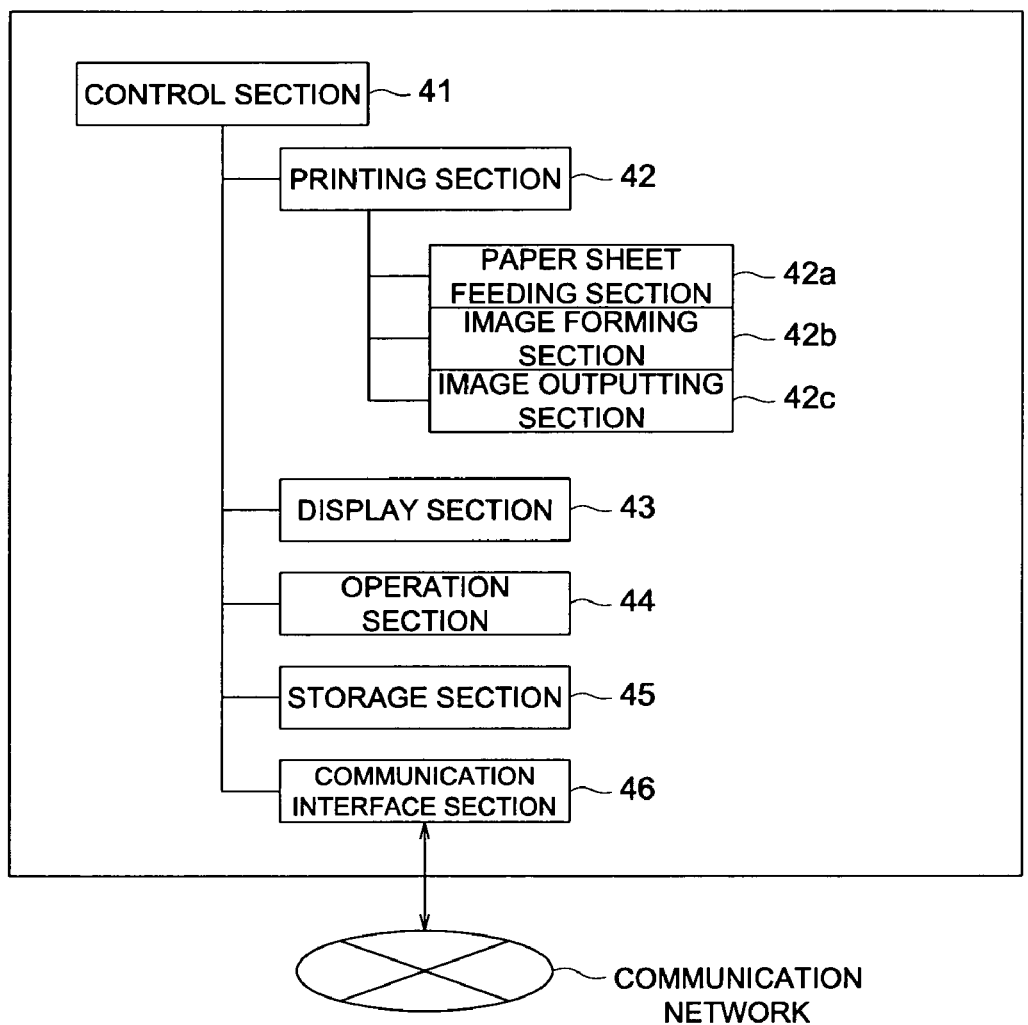
FIG. 2 shows a block diagram indicating a configuration of an image forming apparatus embodied in the present invention.
Figure 3:
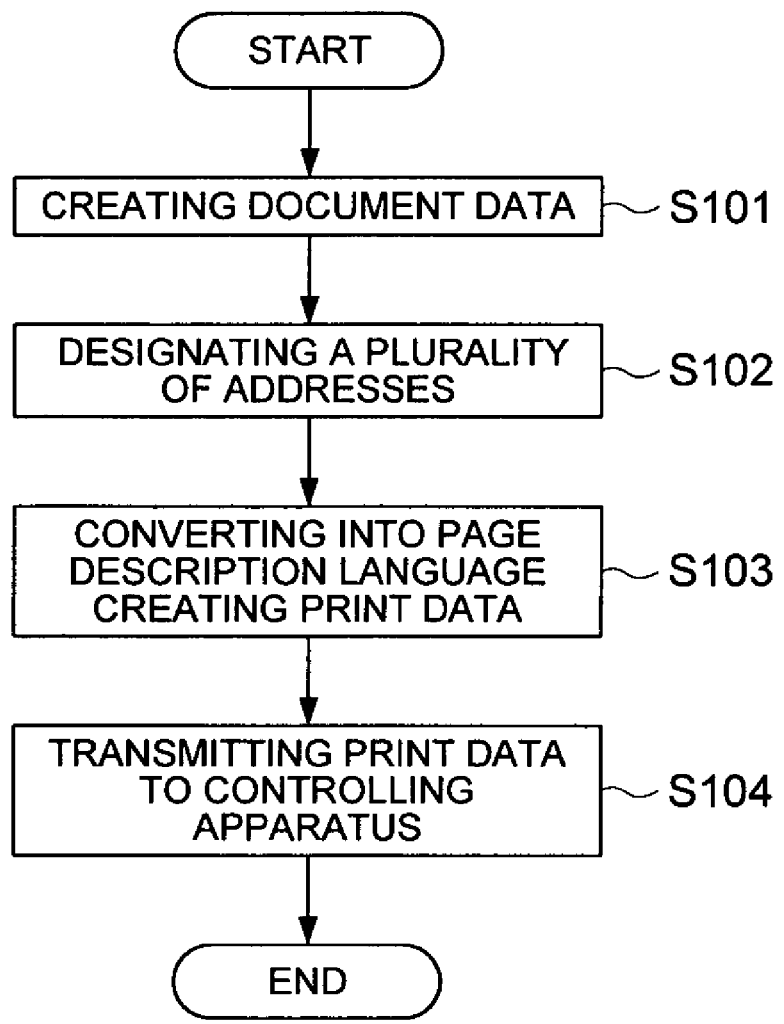
FIG. 3 shows a flowchart indicating a flow of operations to be conducted in a client terminal device embodied in the present invention.
Figure 4:
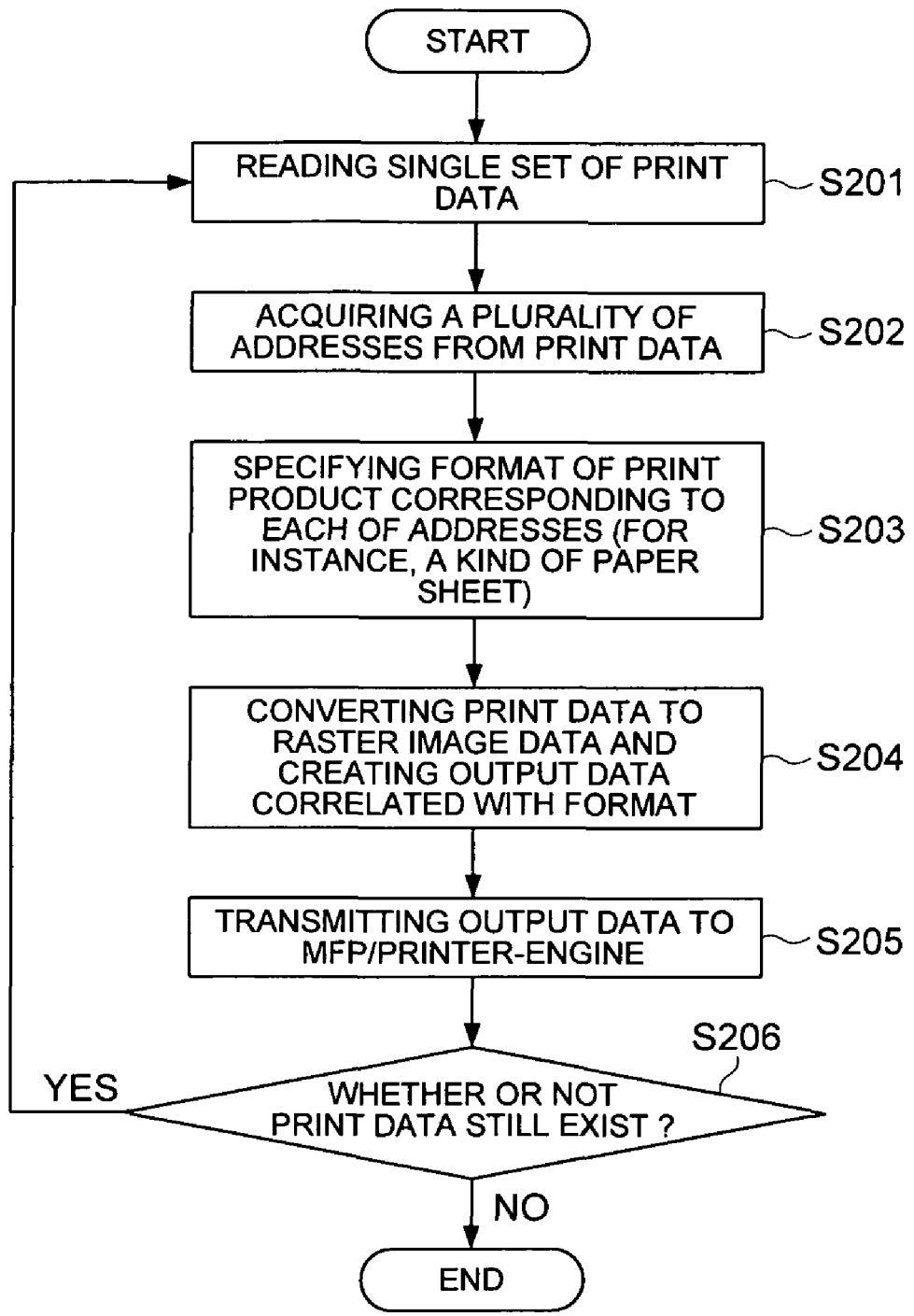
FIG. 4 shows a flowchart indicating a flow of operations to be conducted in a controlling apparatus embodied in the present invention.

In order to describe the preferred embodiment of the present invention in detail, referring to FIG. 1 through FIG. 10, a controlling program, a controlling apparatus, an image forming apparatus and a print controlling method, embodied in the present invention, will be detailed in the following. FIG. 1 shows a schematic diagram of a configuration of the printing system embodied in the present invention, FIG. 2 shows a block diagram indicating a configuration of the image forming apparatus. Further, FIG. 3 shows a flowchart indicating a flow of operations to be conducted in the client terminal device embodied in the present invention, while, FIG. 4 shows a flowchart indicating a flow of operations to be conducted in the controlling apparatus embodied in the present invention. Still further, FIG. 5 shows an exemplary configuration of the database of the print data, and FIGS. 6 through 9 show concrete examples of the correlation information. Yet further, FIG. 10 shows an explanatory schematic diagram for explaining an operation for changing the printing order.

As shown in FIG. 1, a printing system 10, embodied in the present invention, is constituted by: a single or a plurality of client terminal device(s) 20, each of which designates a plurality of addresses for data created by operating a document application program (hereinafter, referred to as document data), and instructs the variable-data printing based on other data described in the Page Description Language converted from the document data (hereinafter, referred to as a print data); a single or a plurality of controlling apparatus(es) 30, such as a workstation, a personal computer, etc., each of which is provided with a RIP (Raster Image Processor) controller for converting the print data acquired from the client terminal device 20 to data capable of being printed by an image forming apparatus 40 (hereinafter, referred to as output data); and a single or a plurality of image forming apparatus(es) 40, such as a printer, a digital compound apparatus (or a multi-functioned apparatus), etc., each of which implements the variable-data printing based on the output data acquired. The single or the plurality of client terminal device(s) 20, the single or the plurality of controlling apparatus(es) 30 and the single or the plurality of image forming apparatus(es) 40 are coupled to each other through a communication network, such as a LAN (Local Area Network), a WAN (Wide Area Network), etc.

Further, the controlling apparatus 30 is constituted by a print data inputting section 32, a raster image data creating section 33, a storage section 34, an address acquiring section 35, a form specifying section 36, an MFP (Multi-Functional Peripheral)/printer-engine interface section 37, a control section 31 for controlling the abovementioned sections, etc.

The print data inputting section 32 establishes a connection with the client terminal device 20, so as to receive the print data sent from the client terminal device 20.

The raster image data creating section 33 converts the print data, received by the print data inputting section 32, to the raster image data by conducting the rasterizing operation.

The storage section 34 includes an HDD (Hard Disc Drive), etc., so as to store various kinds of programs and data representing the correlation information for correlating each of the addresses (or destinations) with the format of the print products, such as a kind of paper sheet, etc., in it.

The address acquiring section 35 acquires a plurality of addresses (or destinations) from the header of the print data received by the print data inputting section 32, etc.

Based on the correlation information stored in the storage section 34, the form specifying section 36 specifies the format of the print products corresponding to each of the addresses acquired by the address acquiring section 35, to create the output data in which the raster image data, created for every address by the raster image data creating section 33, are correlated with the specified format.

The MFP/printer-engine interface section 37 establishes the connection with the image forming apparatus 40, so as to transmit the output data, created by the form specifying section 36, to the image forming apparatus 40.

The control section 31 is constituted by a CPU (Central Processing Unit), storage devices for storing various kinds of programs and data, such as a ROM (Read Only Memory), a RAM (Random Access Memory), etc. In the typical practice, the programs are read from the ROM or the HDD and developed into the RAM, so as to be executed by the CPU.

In this connection, it is applicable that each of the address acquiring section 35 and the form specifying section 36 is configured in the controlling apparatus 30 as either hardware or a controlling program, including computer executable program code for causing a computer to serve as corresponding one of the address acquiring section 35 and the form specifying section 36, to be executed by the CPU of the control section 31. Further, although the system is so constituted that the correlation information is stored in the storage section 34, in the present embodiment hereinafter, it is also applicable that the correlation information is stored in another client terminal device, a server, etc., coupled to the communication network concerned, as far as it is possible for the controlling apparatus 30 to refer the correlation information.

Further, the client terminal device 20 is provided with: a control section including a CPU, storage devices, such as a ROM, a RAM, etc.; a storage section, such as an HDD, etc., for storing various kinds of programs, print data, etc.; a communication interface section, such as a NIC (Network Interface Card), a modem, etc., for coupling the client to the communication network, etc.; a display section, such as an LCD (Liquid Crystal Display), etc.; and an operation section, such as a keyboard, a mouse, etc., to conduct various kinds of operations. In the normal operation, the OS (Operating System), the document application program and the device driver (hereinafter, referred to as the printer driver) for controlling the image forming apparatus 30 are read from the ROM or the HDD and developed into the RAM, so as to be executed by the CPU.

Still further, as shown in FIG. 2, the image forming apparatus 40 is provided with: a printing section 42 to implement the printing operation; a display section 43 to display various kinds of information; an operation section 44 to conduct various kinds of operations; a storage section 45 to store various kinds of programs, various kinds of data, etc., therein; a communication interface section 46 to couple the image forming apparatus 40 to a communication network 60; a control section 41 including a CPU, storage devices, such as a ROM, a RAM, etc., for controlling operations to be conducted in the abovementioned sections; etc. Further, the printing section 42 is constituted by a paper sheet feeding section 42a, an image forming section 42b, an image outputting section 42c, etc.

The paper sheet feeding section 42a includes a plurality of trays for accommodating various kinds of paper sheets, so as to feed a kind of paper sheet, designated by the output data, to the image forming section 42b. The image forming section 42b includes structural elements necessary for conducting the image forming operations, which utilize the image forming process being conformity with the electro-photographic method, the electrostatic recording method, etc., for instance, such as a photoreceptor element, an intermediate transfer belt, a fixing device, various kinds of conveyance belts, etc., so as to form an image based on the output data received through the communication interface section 46, and then, sends the image to the image outputting section 42c. The image outputting section 42c outputs the paper sheets conveyed from the image forming section 42b, and, at that time, applies post processing, desired by the user (for instance, a staple binding processing, a saddle fold processing, etc.), to the paper sheets concerned, as needed.

In this connection, since the configuration shown in FIG. 2 indicates merely a typical configuration of the image forming apparatus 40, it is also applicable that an image recording section and/or an ADF (Automatic Document Feeder), etc., is/are also provided in the image forming apparatus 40 in addition to the abovementioned sections, in such the case that the image forming apparatus 40 reads a document inserted therein when conducting the variable-data printing. Further, although FIG. 1 shows such the configuration that the controlling apparatus 30 converts the print data to the raster image data, it is also applicable that the image forming apparatus 40, instead of the controlling apparatus 30, converts the print data to the raster image data. In that case, the image forming apparatus 40 would be provided with the address acquiring section 35 and the form specifying section 36 as either hardware or software, so as to store the correlation information into the storage section 45.

Next, referring to the flowchart shown in FIG. 3, the processing operations to be conducted by the client terminal device 20 will be detailed in the following.

The control section of the client terminal device 20 reads out the document application program from the ROM or the HDD 21c, or from the other client terminal device, the server, etc., which are coupled to the client terminal device 20 through the communication network, so as to activate the document application program on its own RAM or that of the other client terminal device, the server, etc. Then, in response to the predetermined operations conducted by the user, the master document data (document data), in which a variable field for conducting a merging print operation of the address is designated, are generated by employing the document application program currently activated (Step S101). Alternatively, it is also applicable that the document data created in advance are acquired from the ROM or the HDD, or from the other client terminal device, the server, etc.

Successively, in response to the predetermined operations conducted by the user, the control section designates a plurality of addresses (or destinations) for the document data concerned (Step S102). Concretely speaking, the control section designates a reference file (for instance, an address book file) in which the addresses, to be inserted into the variable field provided in the master document data, are recorded. In this connection, although an address (destination) is typically constituted by a name, a residential address, etc., it is applicable that any information that specifies the user is included in the address, and for instance, only the name of the user or an addition of any other information (for instance, a name of section, etc.) is also applicable for this purpose. Accordingly, it is applicable that either a single or a plurality of variable field(s) is/are provided in a single set of the document data. In other words, such a methodology that the reference file is designated at an initial step for creating the master document data, and then, the variable field(s) is/are provided in the document data in a certain post step after designating the reference file, is also applicable.

Still successively, the control section converts the document data to data described in the Page Description Language by employing the printer driver or the application program, so as to create the print data (Step S103). On that occasion, the control section also records the plurality of addresses designated in Step S102 into the header or the like of the print data. In this connection, the scope of the recording area of the addresses is not limited to the header, and, alternatively, it is also applicable that address data, in which the plural addresses are recorded, are created separately from the print data, so as to correlate the print data and the address data with each other. Further, when the concerned document data is already described in the format conformity with the direct printing operation, such as the XPS (XML Paper Specification), the PDF (Portable Document Format), etc., it is not necessary to newly convert the document data to the data described in the Page Description Language, but the plurality of addresses may be recorded into the header of the document data concerned. Alternatively, such a methodology that, irrespective of the formats of the document data and the print data, the print data itself does not directly possess recording information to be merged into the variable field, but possesses the information for specifying the storing area of the reference file, is also applicable.

Further, although such the case that the client terminal device 20 creates the print data is described in the foregoing, as shown in FIG. 5, it is also applicable that the print data are stored in advance in the ROM and the HDD, or the other client terminal device or the server, which are coupled to the client terminal device 20 concerned through the communication network, as the database, so that the client terminal device 20 can acquire the desired print data therefrom.

Yet successively, the control section controls the communication interface section to transmit the created print data to the controlling apparatus 30.

Next, referring to the flowchart shown in FIG. 4, the processing operations to be conducted by the controlling apparatus 30 will be detailed in the following.

At first, the print data inputting section 32 reads the print data sent from the client terminal device 20 (Step S201).

Successively, the address acquiring section 35 (or the controlling program) acquires the plurality of addresses, to be merged into the variable field, from the header or the like of the print data (Step S202). Alternatively, the address acquiring section 35 acquires the information for specifying the storing area of the reference file, so as to access into the reference file to acquire the plurality of addresses.

Still successively, the form specifying section 36 specifies the format of the print products corresponding to each of the plurality of addresses, based on the correlation information stored in advance in the storage section 34 (Step S203). For instance, when changing the kind of paper sheet corresponding to each of the plurality of addresses, the table in which the addresses are correlated with the properties of the addresses (in other words attributes of the destinations or customers), as shown in FIG. 6, and the other table in which the properties are correlated with the kinds of paper sheets (or trays accommodating paper sheets), as shown in FIG. 7, are stored in advance into the storage section 34. Then, the form specifying section 36 specifies the property corresponding to each of the plurality of addresses based on the table shown in FIG. 6, and successively, specifies the kind of paper sheet (or the tray) corresponding to the property concerned, based on the other table shown in FIG. 7.

In this connection, although the kind of paper sheet corresponding to each of the plurality of addresses is specified on the basis of the two separate tables in the abovementioned present embodiment, for instance, it is also applicable that the single table, in which the plurality of addresses, the properties of the plurality of addresses and the kinds of paper sheets (or the plurality of addresses and the kinds of paper sheets) are correlated with each other, as shown in FIG. 8, is stored in advance, so as to specify the kind of paper sheet corresponding to each of the plurality of addresses, based on the single table. Further, since the contents of the tables shown in FIG. 6 through FIG. 8 are exemplified merely as samples, it is possible to arbitrarily establish kinds of properties and paper sheets as needed. Still further, although such the cases that a kind of paper sheet is changed corresponding to each of addresses are exemplified in the tables shown in FIG. 6 through FIG. 8, for instance, other items, such as a font or a shape of characters, a color of characters, a color of background, a design of background, a presence or absence of fragrance, a kind of fragrance, etc., can be regarded as objects to be changed, as far as the concerned item is such an item that can change the form of the print products without changing the contents of the print (for instance, a main text, images, other than the address). Still further, either a single item or an arbitral combination of them can be handled as the changeable items abovementioned. For instance, when a combination of a kind of paper sheet, a shape of characters and a presence or absence of fragrance is to be established as a table, such the correlation table that is shown in FIG. 9 would be available.

Further, although the correlation information is stored in advance into the storage section 34, etc., in the present embodiment, it is also applicable that history information, including such information that indicates which addresses and how many times the variable-data printing operations have been instructed, etc., are stored in advance into the storage section 34. In this case, the form specifying section 36 can be so constituted that the correlation information is updated or newly created on the basis of the history information, namely, based on the history information, the form specifying section 36 determines a ranking order of the addresses (clients) corresponding to the number of printing times, etc., so as to change or establish the kind of paper sheet corresponding to the ranking order determined in the above, etc.

Still successively, the raster image data creating section 33 parses print data 52 so as to arrange each of the objects constituting the document at a predetermined position, and rasterizes the print data 52 to generate the raster image data for every address (Step S204). Further, the raster image data creating section 33 applies a predetermined color conversion processing to the raster image data by referring to a predetermined color conversion table stored in advance, as needed. In this connection, it is also applicable that the raster image data are created corresponding to the format of the print products, namely, contents of the color conversion processing and/or resolution of the image is/are changed corresponding to the kind of paper sheet, an edge-enhancement processing is applied corresponding to the font or the shape of characters, etc.

On that occasion, when changing the format of the print products (for instance, a kind of paper sheet) corresponding to each of the addresses, if the printing operations are conducted in order of the addresses, it becomes impossible to efficiently conduct the variable-data printing in the configuration shown in FIG. 6 through FIG. 8, since the tray should be changed corresponding to each of addresses 1 through 5. In order to overcome the abovementioned shortcoming, the form specifying section 36, embodied in the present invention, realigns the order of the addresses for every format item of the print products (herein, a kind of paper sheet), as shown in FIG. 10, and after that, creates the raster image data for every address. According to the above, it becomes possible to reduce a number of times for changing the printing condition, such as changes of the trays, etc., resulting in improvement of the implementation efficiency of the variable-data printing.

Further, the form specifying section 36 creates the output data, while correlating the specified format item of the print products with the raster image data created for every address. In this connection, the structure of the output data is not specifically limited. It is applicable that the format of the print products is written into the header, etc., or, the data, in which the format of the print products is recorded, are created separately from the raster image data.

Yet successively, the control section 31 controls the MFP/printer-engine interface section 37 so as to transmit the output data to the image forming apparatus 40 (Step S205), and then, determines whether or not the next print data exist (Step S206). When determining that the next print data exist (Step 5206; Yes), the control section 31 returns to Step S201, to repeat the processing operations as well.

Receiving the output data, the control section 41 of the image forming apparatus 40 reads the format of the print products from the output data. For instance, when a kind of paper sheet is designated, the control section 41 conducts such the controlling operation that a paper sheet is conveyed from a tray accommodating the paper sheets corresponding to each of the raster images, and then, the image forming section 42b prints the corresponding raster image on the paper sheet concerned. Successively, the image outputting section 42c applies a certain post processing to the paper sheets constituting the print product as needed, and then, outputs the print product concerned.

As described in the foregoing, since the controlling apparatus 30 (or the image forming apparatus 40), which is provided with the address acquiring section 35 and the form specifying section 36, embodied in the present invention, conducts the consecutive operations of: acquiring a plurality of addresses from the print data by employing the address acquiring section 35; specifying the format of the print products, such as a kind of paper sheet, etc., corresponding to each of the addresses, based on the correlation information stored in advance in the storage section 34, etc., by employing the form specifying section 36; and creating the output data, while correlating the specified format of the print products with the raster image data created for every address, it becomes possible to conduct the variable-data printing in the format corresponding to the address concerned, without designating the format of the print products for the print data from the client terminal device 20. Accordingly, even when the variable-data printing is conducted by newly creating the master document and the reference file, it is possible to reuse the previously used information, such as the table previously established, etc., in which the address and the property of the concerned address are correlated with each other. Therefore, it readily becomes possible to repeatedly apply the printing formats, being different from each other according to the clients represented by the addresses, to the variable-data printing.

In this connection, although the items, including a kind of paper sheet, a font or a shape of characters, a color of characters, a color of background, a design of background, a presence or absence of fragrance and a kind of fragrance, have been exemplified as the formats of the print products in the embodiments described in the foregoing, the scope of the present invention is not limited to the above embodiments. Any arbitral item that can change the user's impression without changing the contents of the print shall be included in the scope of the formats of the print products defined in the present invention. Further, although such the cases that a kind of paper sheet is changed corresponding to each of addresses have been exemplified in the above embodiment, it is also applicable, as well, that the format of the print products is changed corresponding to arbitral information recorded on the print data, namely, such a case that a property, such as a text, a photographic picture, an illustration, etc., is attached to the contents of the printed record, so as to change a kind of paper sheet based on the property concerned, etc.

The present invention is available for a controlling program, a controlling apparatus, an image forming apparatus and a print controlling method, each of which is employed for controlling the variable-data printing.

According to the controlling program, the controlling apparatus, the image forming apparatus and the print controlling method, embodied in the present invention, it becomes possible to easily designate the format of the print product, corresponding to the property of the printing contents, such as an address, etc., stored in the variable field, without designating the print data.

This is because, in the print controlling method for controlling a variable-data printing to create a plurality of print products based on print data that are provided with a variable field in which variable printing contents and an instruction for the variable-data printing are stored, the method comprises: storing correlation information in which a plurality of records to be stored in the variable field and a plural kinds of paper sheets are correlated with each other; acquiring the plurality of records to be stored in the variable field; specifying each of the plural kinds of paper sheets, which corresponds to each of the plurality of records acquired in the acquiring step, based on the correlation information; converting the print data to raster image data for every one of the plurality of records; and printing each of images based on the raster image data for every one of the plurality of records onto corresponding one of the plural kinds of paper sheets correlated with the plurality of records. Accordingly, it is possible to always establish the appropriate format of the print products corresponding to the property of the address, without designating the format of the print products for every printing content for every print data.

Further, by realigning the plurality of records so that the plurality of records are classified for every kind of the paper sheets or for every format of the print products before the print data are converted to the raster image data for every one of the plurality of records, it becomes unnecessary to frequently change the processing conditions, such as changes of the trays, etc., when implementing the variable-data printing in the image forming apparatus. As a result, it becomes possible to efficiently implement the variable-data printing.

Still further, by updating or creating the correlation information, based on the history information in which a number of usage of each of the plurality of addresses, etc. are stored in advance, it becomes possible to designate the format of the print product more appropriately than ever, namely, in such the case that the format of print product for an specific address, the usage frequency degree of which is specifically high, is to be changed to a high grade one, etc. While the preferred embodiments of the present invention have been described using specific term, such description is for illustrative purpose only, and it is to be understood that changes and variations may be made without departing from the spirit and scope of the appended claims.

What is claimed is:

1. A computer readable medium storing a computer executable program for carrying out a variable-data printing to create plural sets of print products based on print data provided with a variable field to which variable printing contents are to be applied for the plural sets of the print products, the program comprising program code for causing a computer to perform the steps of:
   acquiring plural records each of which is to be applied to the variable field; and
   specifying, for each of the plural sets of the print products, one kind of paper sheet out of plural kinds of paper sheets, based on correlation information in which the plural of records and the plural kinds of paper sheets are correlated with each other.

2. The computer readable medium of claim 1, the program further comprising program code for causing the computer to perform the step of:
   re-ordering the plural records so that the plural records are sorted in accordance with the kinds of the paper sheets.

3. The computer readable medium of claim 1,
   wherein the plural records applied to the variable field are correlated with a plurality of destinations; and
   wherein the correlation information is updated or created, based on a usage history of each of the plurality of destinations.

4. A controlling apparatus that receives print data for a variable-data printing and converts the print data to raster image data to be outputted to an image forming apparatus, the print data for the variable-data printing being for creating plural sets of print products and being provided with a variable field to which variable printing contents are to be applied for the plural sets of the print products, the controlling apparatus comprising:
   a record acquiring section to acquire plural records to be applied to the variable field; and
   a specifying section to specify, for each of the plural sets of the print products, one kind of paper sheet out of plural kinds of paper sheets, based on correlation information in which the plural records and the plural kinds of paper sheets are correlated with each other.

5. The controlling apparatus of claim 4,
   wherein the specifying section re-orders the plural records so that the plural records are sorted in accordance with the kinds of the paper sheets.

6. The controlling apparatus of claim 4,
   wherein the plural records applied to the variable field are correlated with a plurality of destinations; and
   wherein the correlation information is updated or created, based on a usage history of each of the plurality of destinations.

7. An image forming apparatus that receives print data for a variable-data printing and converts the print data to raster image data to create a plural sets of print products, the print data for the variable-data printing being provided with a variable field to which variable printing contents are to be applied for the plural sets of the print products, the image forming apparatus comprising:
   a record acquiring section to acquire plural records to be applied to the variable field; and
   a specifying section to specify, for each of the plural sets of the print products, one kind of paper sheet out of plural kinds of paper sheets, based on correlation information in which the plural records and the plural kinds of paper sheets are correlated with each other.

8. The image forming apparatus of claim 7,
   wherein the specifying section re-orders the plural records so that the plural records are sorted in accordance with the kinds of the paper sheets.

9. The image forming apparatus of claim 7,
   wherein the plural records applied to the variable field are correlated with a plurality of destinations; and
   wherein the correlation information is updated or created, based on a usage history of each of the plurality of destinations.

10. A print controlling method for controlling a variable-data printing to create plural sets of print products based on print data provided with a variable field to which variable printing contents are applied for the plural sets of the print products, the print controlling method comprising:
    storing correlation information in which the plural records to be applied to the variable field and plural kinds of paper sheets are correlated with each other;
    acquiring the plural records to be applied to the variable field;
    specifying, for each of the plural sets of the print products, one kind of paper sheet out of the plural kinds of paper sheets, based on the correlation information;
    converting, for each of the plural sets of the print products, the print data to raster image data in accordance with a corresponding one of the plural records; and
    printing each of images based on the raster image data for every one of the plural records onto corresponding one of the plural kinds of paper sheets correlated with the plural records.

11. The print controlling method of claim 10, further comprising:
    reordering the plural records so that the plural records are sorted in accordance with the kinds of the paper sheets.

12. The print controlling method of claim 10,
    wherein the plural records applied to the variable field are correlated with a plurality of destinations; and
    wherein the correlation information is updated or created, based on a usage history of each of the plurality of destinations.

* * * * *